United States Patent
Ise

(10) Patent No.: US 10,212,382 B2
(45) Date of Patent: Feb. 19, 2019

(54) IMAGE PROCESSING DEVICE, METHOD FOR CONTROLLING IMAGE PROCESSING DEVICE, AND COMPUTER-READABLE STORAGE MEDIUM STORING PROGRAM

(71) Applicant: CANON KABUSHIKI KAISHA, Tokyo (JP)

(72) Inventor: Toshimichi Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 15/406,488

(22) Filed: Jan. 13, 2017

(65) Prior Publication Data
US 2017/0208288 A1   Jul. 20, 2017

(30) Foreign Application Priority Data

Jan. 18, 2016   (JP) .................................. 2016-007393

(51) Int. Cl.
*H04N 5/222*   (2006.01)
*H04N 5/445*   (2011.01)
*H04N 5/232*   (2006.01)
*H04N 5/907*   (2006.01)
*H04N 5/76*    (2006.01)
*H04N 5/77*    (2006.01)

(52) U.S. Cl.
CPC ......... *H04N 5/445* (2013.01); *H04N 5/23216* (2013.01); *H04N 5/23293* (2013.01); *H04N 5/76* (2013.01); *H04N 5/907* (2013.01); *H04N 5/44513* (2013.01); *H04N 5/772* (2013.01)

(58) Field of Classification Search
CPC combination set(s) only.
See application file for complete search history.

(56) References Cited

U.S. PATENT DOCUMENTS

| 10,068,152 B2* | 9/2018 | Kitaya | G06T 7/60 |
|---|---|---|---|
| 2006/0001758 A1* | 1/2006 | Nam | G06T 11/60 |
| | | | 348/333.12 |
| 2012/0127349 A1* | 5/2012 | Matsushima | H04N 5/23216 |
| | | | 348/240.99 |
| 2012/0162476 A1* | 6/2012 | Onoda | H04N 5/23293 |
| | | | 348/231.99 |
| 2015/0212713 A1* | 7/2015 | Takehara | G06F 3/04845 |
| | | | 715/801 |

FOREIGN PATENT DOCUMENTS

| JP | 2008294705 A | 12/2008 |
|---|---|---|
| JP | 2015126242 A | 7/2015 |

* cited by examiner

*Primary Examiner* — Gary C Vieaux
(74) *Attorney, Agent, or Firm* — Canon U.S.A., Inc. IP Division

(57) ABSTRACT

A captured image and a blank area generated by a difference between an aspect ratio of the image and an aspect ratio of a screen are displayed on the screen. An item is located on the image and is displayed on the screen when the item is set to be superimposed and recorded on the image, and the item is located on the blank area and is displayed on the screen when the item is set to be recorded without being superimposed on the image. The image on which the item is superimposed is stored in a memory unit when the item is set to be superimposed and recorded on the image, and the image on which the item is not superimposed is stored in the memory unit when the item is set to be recorded without being superimposed on the image.

7 Claims, 10 Drawing Sheets

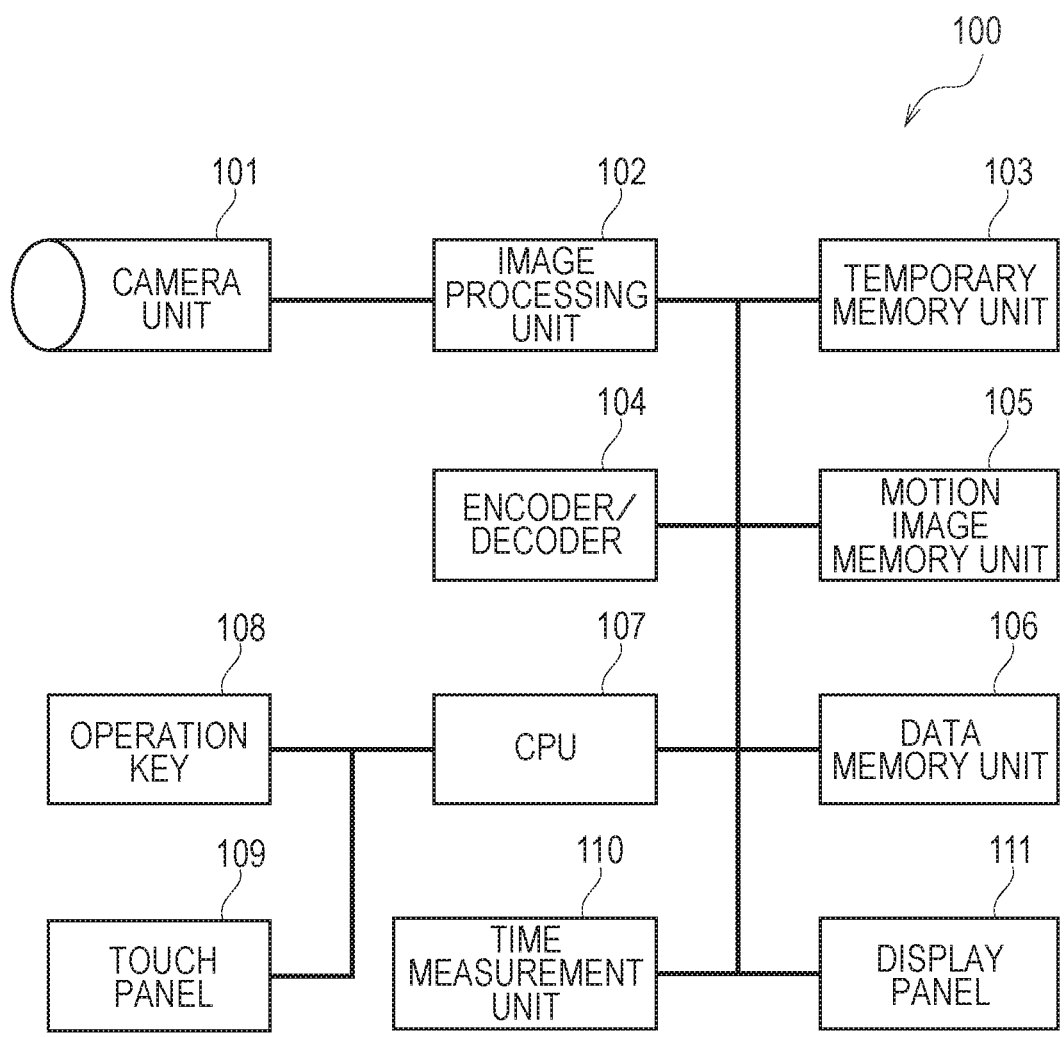

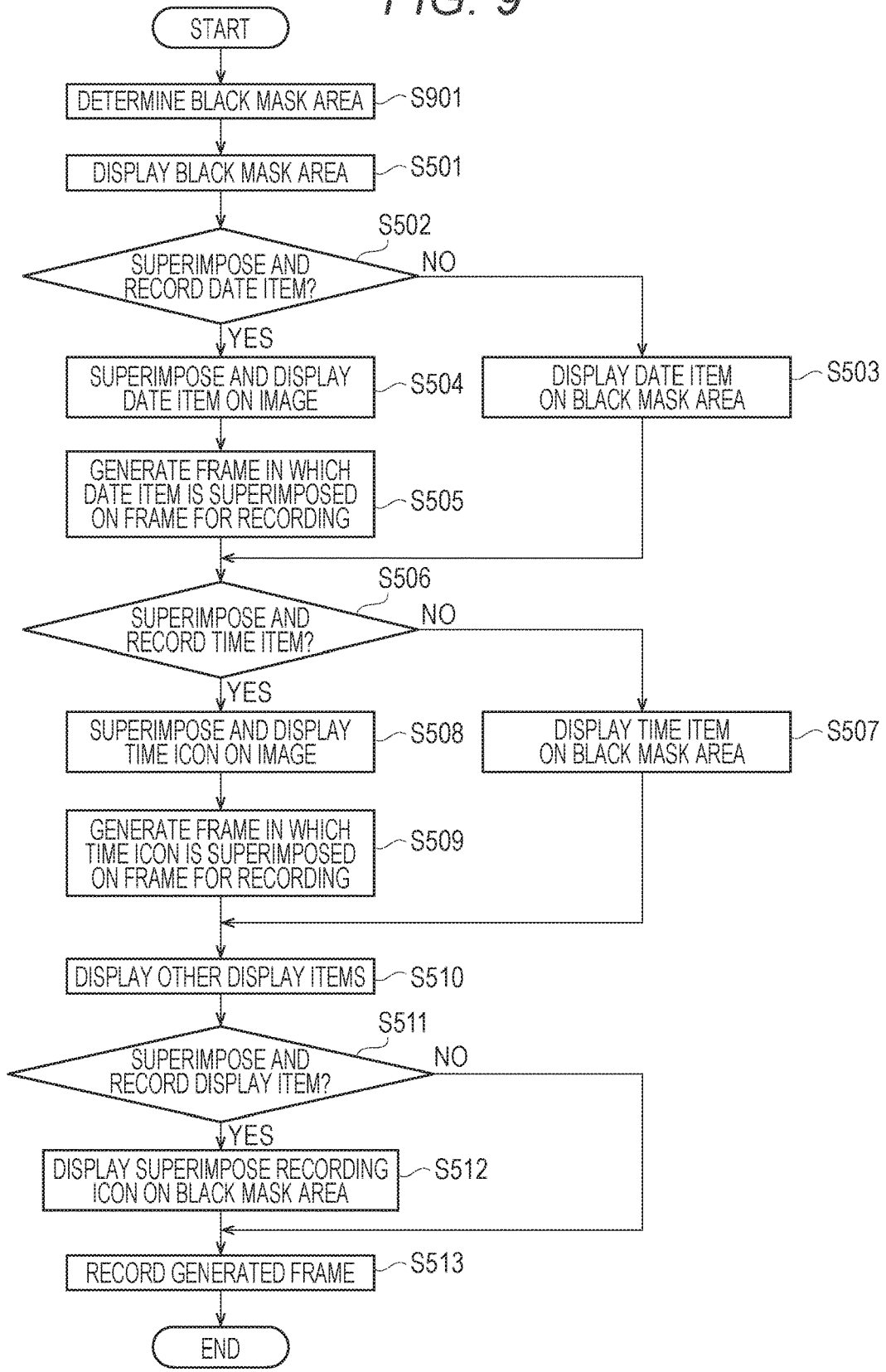

IMAGE PROCESSING DEVICE, METHOD FOR CONTROLLING IMAGE PROCESSING DEVICE, AND COMPUTER-READABLE STORAGE MEDIUM STORING PROGRAM

BACKGROUND

Field

The present invention relates to an image processing device, a method for controlling an image processing device, and a computer-readable storage medium storing a program.

Description of the Related Art

Recently, the aspect of a display panel of an information device can vary and motion images and still images can be recorded with various aspects. When the aspect of the display panel is different from the aspect of an image to be recorded, there is a blank area on the display panel, in order to display the entire image.

Japanese Patent Laid-Open No. 2008-294705 discloses a display device that displays a display item in a blank area of a live image or a playback image.

Moreover, Japanese Patent Laid-Open No. 2015-126242 discloses an imaging device in which an image captured by a first imaging unit is superimposed and displayed on an image captured by a second imaging unit instead of a blank area.

However, the above Patent Literatures do not provide a solution for a case in which a display item is to be superimposed and recorded on an image. When a user wishes for a display item be superimposed and recorded on an image, there can arise a problem that a display item cannot be superimposed and recorded on an image if all display items displayed on a display unit are in a blank area. On the other hand, if a display item is always superimposed and displayed on an image, there is a problem that the number of display items is large and visibility of the entire screen is therefore lowered.

SUMMARY OF THE INVENTION

Various embodiments of the present disclosure have been developed to address the above-described need. Further, aspects of various embodiments are to maintain visibility of an image and to superimpose and record a display item on an image.

In various embodiments, an image processing device is provided that includes a processor and a memory storing a program which, when executed by the processor, causes the image processing device to: display an image and a blank area generated by a difference between an aspect ratio of the image and an aspect ratio of a screen, on the screen; set whether or not to superimpose and record an item on the image; locate the item on the image and display the item on the screen when the item is set to be superimposed and recorded on the image, and locate the item on the blank area and display the item on the screen when the item is set to be recorded without being superimposed on the image and store the image on which the item is superimposed, in a memory unit, when the item is set to be superimposed and recorded on the image, and store the image on which the item is not superimposed, in the memory unit, when the item is set to be recorded without being superimposed on the image.

Further features will become apparent from the following description of exemplary embodiments (with reference to the attached drawings).

BRIEF DESCRIPTION OF THE DRAWINGS

FIG. 1 is a block diagram illustrating a configuration of a video camera according to an embodiment.

FIG. 9 is a flow chart showing a process according to the third embodiment.

DESCRIPTION OF THE EMBODIMENTS

Figure 2A:
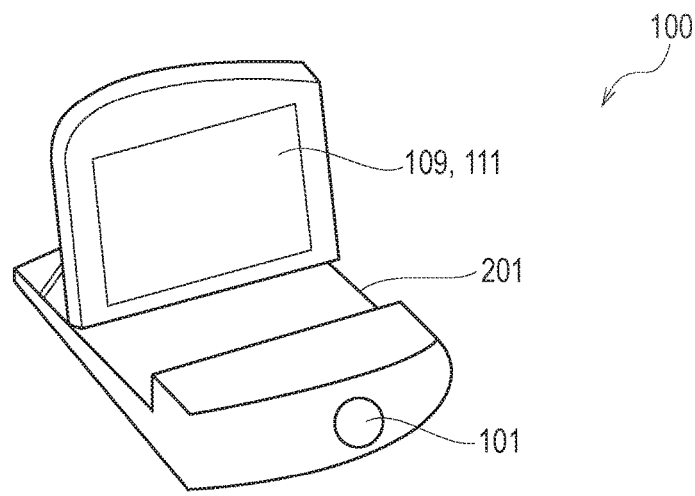
FIGS. 2A to 2C illustrate an external structure of the video camera according to an embodiment.

Various embodiments will be described below with reference to the drawings. In the embodiments described below, an example of a recording device is a digital video camera (hereinafter referred to as video camera).

First Embodiment

FIG. 1 is a block diagram illustrating a configuration of a video camera 100.

The video camera 100 includes a camera unit 101, an image processing unit 102, a temporary memory unit 103, an encoder/decoder 104, a motion image memory unit 105, a data memory unit 106, and a CPU 107. In addition, the video camera 100 includes an operation key 108, a touch panel 109, a time measurement unit 110, and a display panel 111.

The CPU 107 is an operation unit that reads a program from the data memory unit 106 to control operation of the entire video camera 100 in accordance with the program. The CPU 107 has a function to run several tasks in parallel by the program thus read. Specifically, the CPU 107 operates as mode control task, camera control task, recorder control task, which is an example of memory control means, and display control task, which is an example of display control means.

The camera unit 101 includes a mechanism to input an analog image signal to the video camera 100. Specifically, the camera unit 101 includes a lens for forming an image by light from an object, an imaging element for carrying out photoelectric conversion of the object image formed by the lens, and a circuit for driving the imaging element.

The image processing unit 102 converts the analog image signal input from the camera unit 101 to digital motion image data, and makes a correction on the basis of predetermined image processing such as removal of noise.

The operation of the camera unit 101 and the image processing unit 102 is controlled by camera control task carried out by the CPU 107.

A part of the temporary memory unit 103 functions as a work area of the CPU 107 and the temporary memory unit 103 provides a frame buffer for motion image and a frame buffer for OSD described later.

The encoder/decoder 104 encodes the motion image data from the image processing unit 102. The motion image data encoded by the encoder/decoder 104 is temporarily stored in the temporary memory unit 103, and thereafter, stored in the motion image memory unit 105 together with accompanying management data. In contrast, when the motion image is played, the encoded motion image data (image data) read from the motion image memory unit 105 is decoded by the encoder/decoder 104 via the temporary memory unit 103, and thereafter, expanded again in the frame buffer for motion image in the temporary memory unit 103. Recording of the encoder/decoder 104 is controlled by recorder control task carried out by the CPU 107.

The management data read from the data memory unit 106 or the motion image memory unit 105 is used for generation of OSD (On Screen Display) data (hereinafter referred to as OSD), that is, data for letter display or GUI (Graphical User Interface) superimposed on a captured image or a playback image. The CPU 107 generates OSD and stores the OSD in a frame buffer for OSD in the temporary memory unit 103. The CPU 107 superimposes the content of the frame buffer for motion image on the content of the frame buffer for OSD to display on the display panel 111. The display control displayed on the display panel 111 is controlled by display control task carried out by the CPU 107.

The data memory unit 106 stores a program to be executed by the CPU 107, information regarding OSD, and the like.

The operation key 108 and the touch panel 109 are operation units for accepting operation instructions by the user. The operation key 108 and the touch panel 109 are examples of acceptance unit.

The time measurement unit 110 manages date and measures recording time.

The display panel 111 displays a captured image and a playback image and displays OSD. An LCD panel or the like can be used as the display panel 111.

Figure 2B:
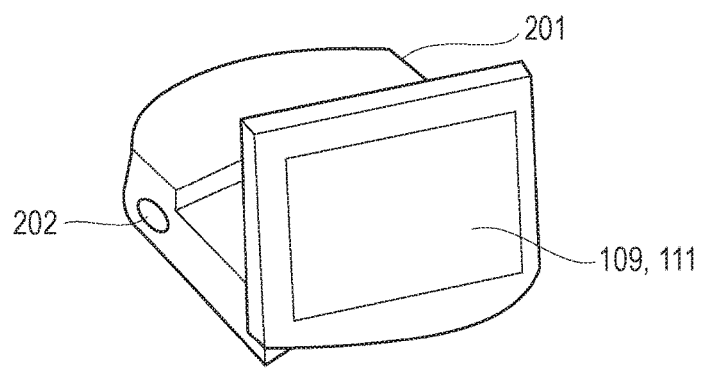
Figure 2C:
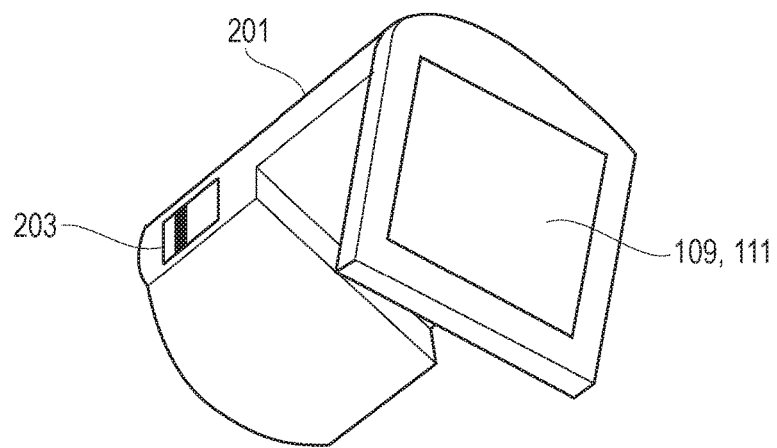

FIGS. 2A to 2C illustrate an example of the appearance of the video camera 100 seen from three different viewpoints.

As illustrated in FIG. 2A, the video camera 100 includes a main body 201 with the camera unit 101 and the display panel 111 fixed to the main body 201, the facing direction of which can be changed.

In addition, as illustrated in FIG. 2B, a shutter button 202 as a part of the operation key 108 is fixed to the main body 201. The video camera 100 can record a still image at any timing when the user presses the shutter button 202.

Moreover, as illustrated in FIG. 2C, a lens cover slide switch 203 as a part of the operation key 108 is fixed to the main body 201. The user can open and close a lens cover by moving the lens cover slide switch 203.

Note that, the display panel 111 and the touch panel 109 are integrally formed. For example, the touch panel 109 is provided on an upper layer of the display screen of the display panel 111 so that the light transmission ratio does not prevent display of the display panel 111. Then, it is possible to have a GUI that enables the user to directly operate the screen displayed on the display panel 111 by correlating the input coordinate on the touch panel 109 and the display coordinate on the display panel 111. The touch panel 109 may be any type of resistive type, capacitance type, surface acoustic wave type, infrared type, electromagnetic induction type, image recognition type, optical sensor type, and the like.

The CPU 107 can detect the following operations to and states of the touch panel 109.

(1) touch down: touch panel 109 is touched by a finger or a pen (2) touch on: state in which touch panel 109 is being touched by a finger or a pen (3) move: a finger or a pen is moved with the finger or the pen kept on the touch panel 109

(4) touch up: a finger or a pen that has touched the touch panel 109 is removed (5) touch off: state in which nothing is touching the touch panel 109

The operations and the states described above and the position coordinate where a finger or a pen touches on the touch panel 109 are notified to the CPU 107. The CPU 107 determines what kind of operation has been done on the touch panel 109 on the basis of the notified information.

With regard to "move," the CPU 107 determines the direction of move of a finger or a pen that moves on the touch panel 109 for each vertical component and horizontal component on the touch panel 109 on the basis of change in the position coordinate. In addition, the CPU 107 determines that "stroke" has been drawn when the user performs "touch down" and "touch up" with "move" for certain period on the touch panel 109. The operation to quickly draw "stroke" is referred to as "flick." "Flick" is an operation for quickly moving a finger for certain distance with the finger kept on the touch panel 109 and removing the finger, in other words, it is an operation for quickly tracing on the touch panel 109 so as to flip on the touch panel 109. The CPU 107 determines that "flick" has been performed when "move" for more than the predetermined distance with more than the predetermined speed is detected and "touch up" is subsequently detected. In addition, the CPU 107 determines that "drag" (movement operation) has been performed when "move" for more than the predetermined distance with less than the predetermined speed is detected.

Each mode control task carried out by the CPU 107 operates as follows. That is, an operation state of the entire video camera 100 is shifted in accordance with an instruction from the operation unit (operation key 108 and touch panel 109), a request from another task, or change of an internal state managed by mode control task itself and events are notified to each task.

Figure 3A:
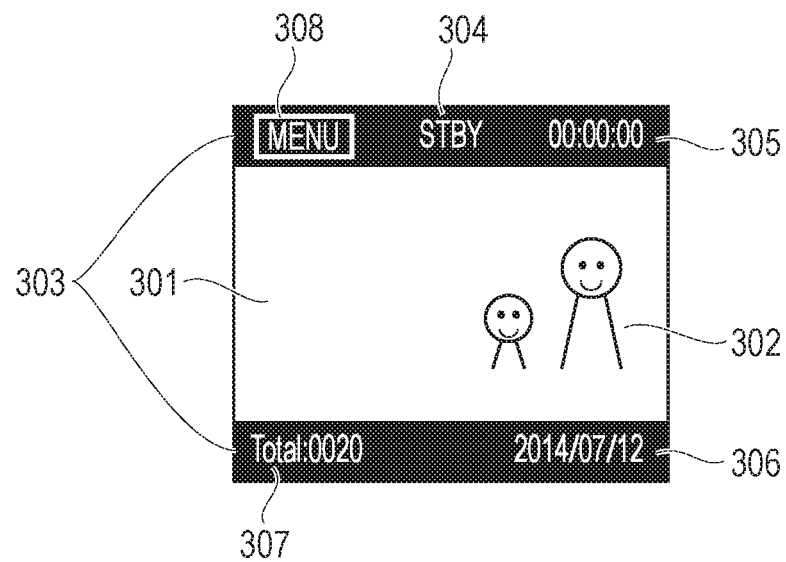
FIGS. 3A and 3B illustrate an example of a screen of a display panel according to an embodiment.
Figure 3B:
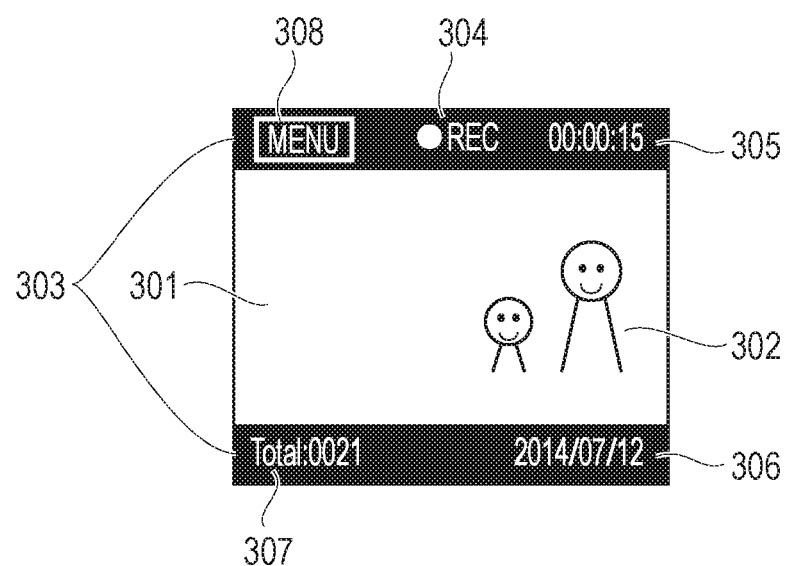

FIGS. 3A and 3B illustrate an example of a screen displayed on the display panel 111 in normal capture mode. FIGS. 3A and 3B illustrate an example of display in which a display item is not superimposed on an image (second display). This is an example in which a display item is not superimposed on an image at all. On the other hand, as illustrated in FIGS. 4B and 4C and FIGS. 4D to 4F mentioned later, a display item may be partially superimposed on an image (second display) so that a part of an item superimposed on an image is smaller than the display in which a display item is superimposed on an image (first display).

FIG. 3A illustrates an example of a screen displayed on the display panel 111 before start of recording in the normal capture mode. Here, the aspect ratio of the display panel 111 is 4:3 and the aspect ratio of the motion image content to be recorded is 16:9.

As illustrated in FIG. 3A, entire image 301 captured by the camera unit 101 is displayed at the screen center of the display panel 111 with 16:9. Here, an object 302 is included in the image 301 as an example of object image. In addition, a black mask area 303 is displayed as OSD in the blank area in the upper and lower parts of the screen. The black mask area 303 is an area not recorded as an image. The CPU 107 changes and displays the size of the black mask area 303 in accordance with the aspect ratio of the display panel 111 and the aspect ratio of the motion image content.

Note that, when the aspect ratio of an image captured by the camera unit 101 is 4:3 and the aspect ratio of an image to be recorded is 16:9, the CPU 107 may display the black mask area 303 in semi-transmissive manner and display the image captured by the camera unit 101 on the entire screen.

As illustrated in FIG. 3A, a recording state item 304, a time item 305, a date item 306, a total number of contents 307, and a menu button 308 are displayed as OSD on the screen as several display items. The display item is OSD, is not included in the captured image, and is data generated by the CPU 107 or recorded in advance. Here, all of the display items are displayed on the black mask area 303. Here, the display items are displayed as white letters for example, so that the display items can visually confirmed on the black mask area 303.

The recording state item 304 indicates a recording state, and "STBY," which indicates a state in which recording is not being performed, is displayed here. The time item 305 indicates recording time code and "00:00:00" is displayed here. The date item 306 indicates recording date and "2014/07/12" is displayed here. The total number of contents 307 indicates the number of contents recorded in the motion image memory unit 105 and "Total: 0020" is displayed here. The user can touch the menu button 308 and "MENU" is displayed.

FIG. 3B illustrates an example of a screen displayed on the display panel 111 during recording in the normal capture mode. Here, "REC," which indicates a state in which recording is being performed, is displayed as the recording state item 304. In addition, the elapsed time "00:00:15" since the start of recording is displayed as the time item 305.

Next, the video camera 100 according to the present embodiment can perform OSD superimpose recording that superimposes and records a part of the display items described above on an image. Specifically, when the user selects the setting of OSD superimpose recording from the menu button 308, the CPU 107 displays a setting screen of OSD superimpose recording.

Figure 4A:
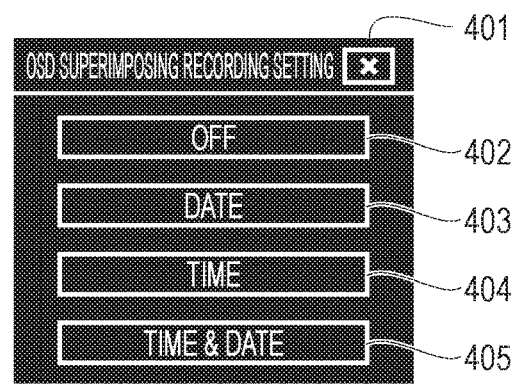
FIGS. 4A to 4C illustrate an example of a screen of a display panel according to the first embodiment.

FIG. 4A illustrates an example of a setting screen of OSD superimpose recording. Here, a close button 401, an off button 402, a date superimpose button 403, a time superimpose button 404, and a time & date superimpose button 405 are displayed on the setting screen as OSD. The user can touch these buttons.

The close button 401 is a button to end the setting of OSD superimpose recording. The off button 402 is a button to turn off OSD superimpose recording (first setting). The date superimpose button 403 is a button to set a mode in which the date item 306 is superimposed and recorded on an image (second setting). The time superimpose button 404 is a button to set a mode in which the time item 305 is superimposed and recorded on an image. The time & date superimpose button 405 is a button to set a mode in which the time item 305 and the date item 306 are superimposed and recorded on an image.

When the user selects any of the off button 402, the date superimpose button 403, the time superimpose button 404, and the time & date superimpose button 405, the CPU 107 stores a set value in accordance with the button in the data memory unit 106.

Figure 4B:
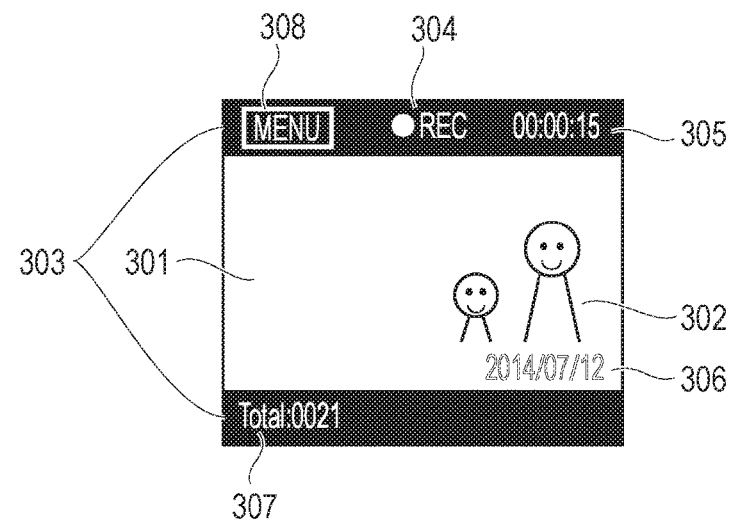

FIG. 4B illustrates an example of the screen when the image 301 is displayed on the display panel 111 when the date superimpose button 403 illustrated in FIG. 4A is selected (when set so that the date is superimposed and recorded). Here, the date item 306 is superimposed and displayed on the image 301 as OSD (first display). In addition, the date item 306 is displayed with letters with outline. That is, although the date item 306 is displayed with letters of single color on the black mask area 303, the color on the image 301 is changed so that the color is distinct on a natural image.

Figure 4C:
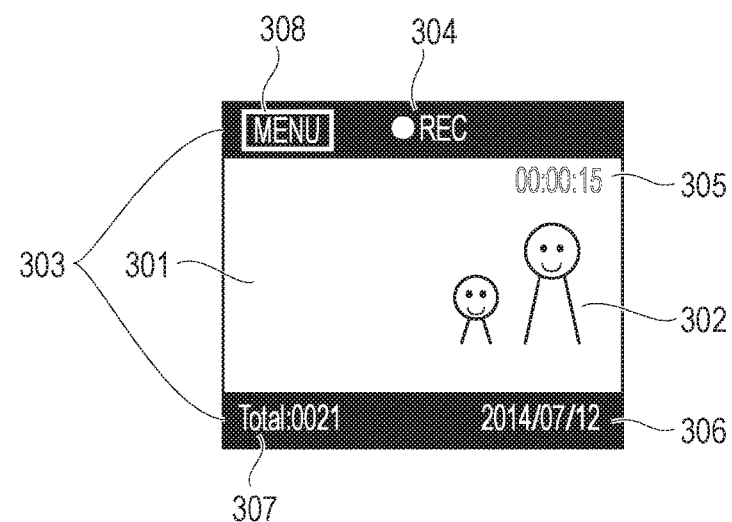

FIG. 4C illustrates an example of the screen when the image 301 is displayed on the display panel 111 when the time superimpose button 404 illustrated in FIG. 4A is selected. Here, the time item 305 is superimposed and displayed on the image 301 as OSD. In addition, the time item 305 is displayed with letters with outline as with the date item 306 illustrated in FIG. 4B.

Figure 4D:
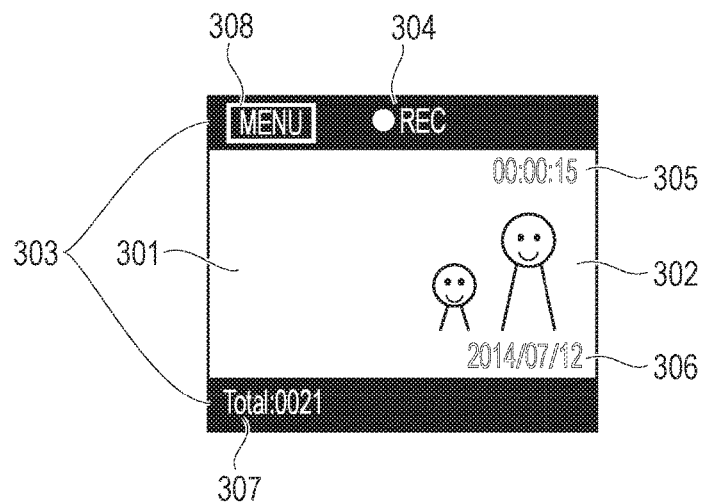
FIGS. 4D to 4F illustrate an example of the screen of the display panel according to the first embodiment.

FIG. 4D illustrates an example of the screen when the image 301 is displayed on the display panel 111 when the time & date superimpose button 405 illustrated in FIG. 4A is selected. Here, the time item 305 and the date item 306 are superimposed and displayed on the image 301 as OSD. In addition, the time item 305 and the date item 306 are displayed with letters with outline as with FIGS. 4B and 4C.

Figure 4E:
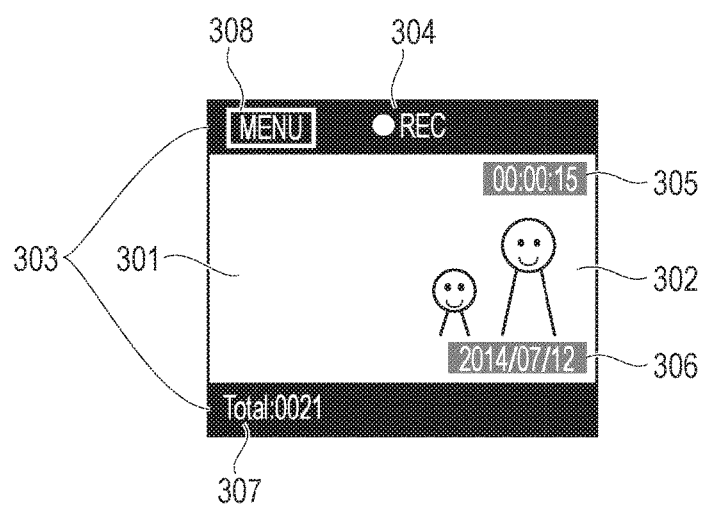

FIG. 4E illustrates an example of the screen when the image 301 is displayed on the display panel 111 when the time & date superimpose button 405 illustrated in FIG. 4A is selected. Here, the time item 305 and the date item 306 are displayed with letters with changed background color (hereinafter referred to as letters with different background) instead of the letters with outline.

Figure 4F:
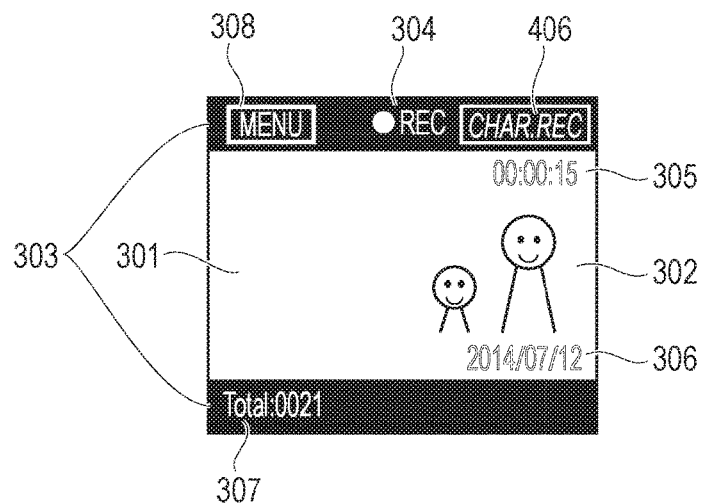

FIG. 4F illustrates an example of the screen when the image 301 is displayed on the display panel 111 when the time & date superimpose button 405 illustrated in FIG. 4A is selected. Here, a superimpose recording icon 406 is displayed as OSD as a display item.

The superimpose recording icon 406 indicates that the display item is superimposed and recorded, and here, "CHAR.REC" is displayed on the black mask area 303. This position is a position where the time item 305 has been displayed when the display item is not superimposed and recorded. The user can recognize that the display item is superimposed and recorded by confirming the superimpose recording icon 406.

Note that, the position where the superimpose recording icon 406 is displayed is not limited thereto, and the superimpose recording icon 406 can be displayed at a position that is a margin when the display item is superimposed and recorded. Therefore, for example, the superimpose recording icon 406 may be displayed at a position where the date item 306 is displayed when the display item is not being superimposed and recorded.

Figure 5:
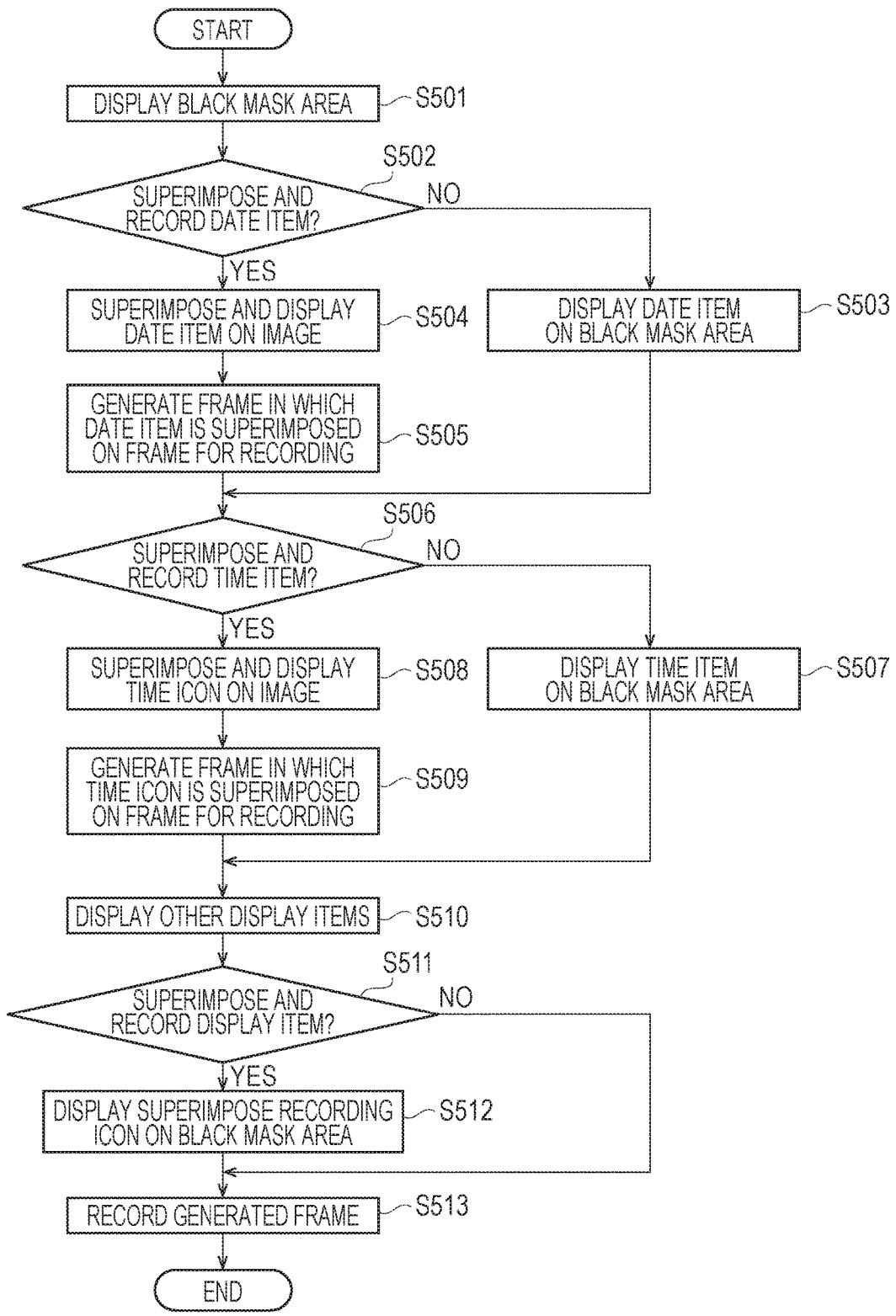
FIG. 5 is a flow chart showing a process according to the first embodiment.

FIG. 5 is a flow chart showing a process focusing on display control according to the present embodiment. The flow chart of FIG. 5 begins when the video camera 100 starts capturing an image. In addition, the flow chart of FIG. 5 is realized when the CPU 107 reads a program from the data memory unit 106, expands the program to the temporary memory unit 103, and executes the program.

In Step S501, the CPU 107 generates the black mask area 303 and displays the generated black mask area 303 around a blank area, that is, around the image 301 as OSD. When displaying the black mask area 303, the CPU 107 changes the size of the black mask area 303 in accordance with the aspect ratio of the display panel 111 and the aspect ratio of a motion image content to be captured. The CPU 107 stores the size and the position of the displayed black mask area 303 in the temporary memory unit 103. Here, as illustrated in FIG. 3A, the CPU 107 displays the image 301 at the center of the screen and displays the black mask area 303 at the upper and lower parts of the image 301.

In Step S502, the CPU 107 determines whether or not to superimpose and record a date item. In the setting screen of FIG. 4A, a set value to superimpose and record a date item is stored in the data memory unit 106 when the user selects the date superimpose button 403 or the time & date superimpose button 405. Therefore, the CPU 107 can read out the set value stored in the data memory unit 106 and determine whether or not to superimpose a date item on the basis of the set value. The process proceeds to Step S504 if a date item is to be superimposed and proceeds to Step S503 if not.

In Step S503, the CPU 107 acquires date information from the time measurement unit 110, generates the date item 306, and displays the date item 306 at the predetermined position on the black mask area 303. Here, as illustrated in FIG. 3A, the CPU 107 displays the date item 306 at the right on the lower black mask area 303. This process corresponds to a process for displaying with smaller area where the displayed item is superimposed on the image 301 as compared with a case in which the date item 306 is superimposed and recorded on the image 301.

In Step S504, the CPU 107 acquires date information from the time measurement unit 110, generates the date item 306, and superimposes and displays the date item 306 at the predetermined position on the image 301. Here, as illustrated in FIG. 4B, the CPU 107 displays the date item 306 at the lower right side on the image 301. Note that, as illustrated in FIG. 4E, the CPU 107 may change the color and the font type, that is, the shape, of the date item 306.

In Step S505, the CPU 107 generates a frame that is obtained by superimposing and adding the date item 306 generated in Step S504 on the predetermined position of a frame for record. Here, the CPU 107 adds the date item 306 so that the same position as the position displayed in Step S504 is obtained. Note that, the frame for record is a frame before record in the motion image memory unit 105 and of a motion image data transmitted from the image processing unit 102. As described, the CPU 107 generates a frame obtained by superimposing the date item 306 on the frame of the motion image data from the image processing unit 102.

In Step S506, the CPU 107 determines whether or not to superimpose and record a time item. In the setting screen of FIG. 4A, a set value for superimposing and recording a time item is stored in the data memory unit 106 when the user selects the time superimpose button 404 or the time & date superimpose button 405. Therefore, the CPU 107 can read out the set value stored in the data memory unit 106 and determine whether or not to superimpose a time item on the basis of the set value. The process proceeds to Step S508 if a time item is to be superimposed and proceeds to Step S507 if not.

In Step S507, the CPU 107 acquires information of elapsed time since recording has started from the time measurement unit 110, generates the time item 305, and displays the time item 305 at the predetermined position on the black mask area 303. Here, as illustrated in FIG. 3B, the CPU 107 displays the time item 305 at the right on the upper black mask area 303. This process corresponds to a process for displaying with smaller area where the displayed item is superimposed on the image 301 as compared with a case in which the time item 305 is superimposed and recorded on the image 301.

In Step S508, the CPU 107 acquires information of elapsed time since recording has started from the time measurement unit 110, generates the time item 305, and superimposes and displays the time item 305 at the predetermined position on the image 301. Here, as illustrated in FIG. 4C, the CPU 107 displays the time item 305 at the upper right side on the image 301. Note that, when the date item 306 on the image 301 is superimposed in Step S504, the time item 305 and the date item 306 are displayed on the image 301 as illustrated in FIG. 4D. In addition, as illustrated in FIG. 4E, the CPU 107 may change the color and the font type, that is, the shape, of the time item 305.

In Step S509, the CPU 107 generates a frame obtained by superimposing and adding the time item 305 generated in Step S508 on the predetermined position of a frame for recording. Here, the CPU 107 adds the time item 305 so that the same position as the position displayed in Step S508 is obtained. Note that, when a frame on which the date item 306 is superimposed is generated in Step S505, the CPU 107 generates a frame by superimposing the time item 305 on the frame. Therefore, a frame in which the date item 306 and the time item 305 are superimposed on each other is generated. On the other hand, when a frame to which the date item 306 is added is not generated, the CPU 107 generates a frame obtained by superimposing the time item 305 on the frame of the motion image data from the image processing unit 102.

In Step S510, the CPU 107 displays other display items at the predetermined position on the black mask area 303. Here, as illustrated in FIG. 4D, the CPU 107 displays the recording state item 304, the total number of contents 307, and the menu button 308 on the black mask area 303.

In Step S511, the CPU 107 determines whether or not to superimpose and record a display item. A set value for superimposing and recording a display item is stored in the data memory unit 106 when the user selects any of the date superimpose button 403, the time superimpose button 404, and the time & date superimpose button 405 in the setting screen of FIG. 4A. Therefore, the CPU 107 can read out the set value stored in the data memory unit 106 and determine whether or not to superimpose a display item on the basis of the set value. The process proceeds to Step S512 if a display item is to be superimposed.

In Step S512, the CPU 107 displays the superimpose recording icon 406 that informs the user that a display item is superimposed and recorded. Here, as illustrated in FIG. 4F, the CPU 107 displays the superimpose recording icon 406 at the right on the upper black mask area 303. Note that, not only the superimpose recording icon 406 but also icons regarding at least any of camera setting, media setting, and audio setting may be displayed on the black mask area 303. In addition, as illustrated in FIG. 4D, the CPU 107 may not display the superimpose recording icon 406 and may switch display and non-display of the superimpose recording icon 406 in accordance with the setting by the user.

In Step S513, the CPU 107 can record the image on which a display item is superimposed by recording the generated frame in the motion image memory unit 105. Note that, a frame on which a display item is superimposed is not generated since the process proceeds from Step S502 to Step S503 and further, from Step S506 to Step S507, when a set value for turning off OSD superimpose recording is stored in the data memory unit 106. In this case, the CPU 107 records the frame for recording, that is, the frame of the motion image data transmitted from the frame for recording, that is, the image processing unit 102, in the motion image memory unit 105 without any modification.

A motion image on which a display item is superimposed or a motion image on which a display item is not superimposed is recorded by repeating the processes of Steps S501 to S513 until recording of captured images is completed.

According to the present embodiment, the user can confirm an image similar to the image that is actually recorded by displaying a display item at the position superimposed on an image when a display item is to be superimposed and recorded on an image. On the other hand, visibility of an image can be improved by displaying a display item at the position not superimposed on an image when a display item is not to be superimposed and recorded on an image.

In addition, since a case in which a display item is superimposed and recorded on an image and a case in which a display item is recorded without superimposing on an image are switched in accordance with the setting by the user, the user can correctly select an intended way of recording.

Second Embodiment

In the first embodiment, a case in which a display item is superimposed and recorded on an image in accordance with the setting by the user has been described. In the second embodiment, a case in which a display item is superimposed and recorded on an image when the user operates so that the display item is superimposed on the image, that is, when the user drags the display item, will be described. Note that, the configuration of a video camera 100 is the same as that of the first embodiment and description thereof will be omitted.

Figure 6A:
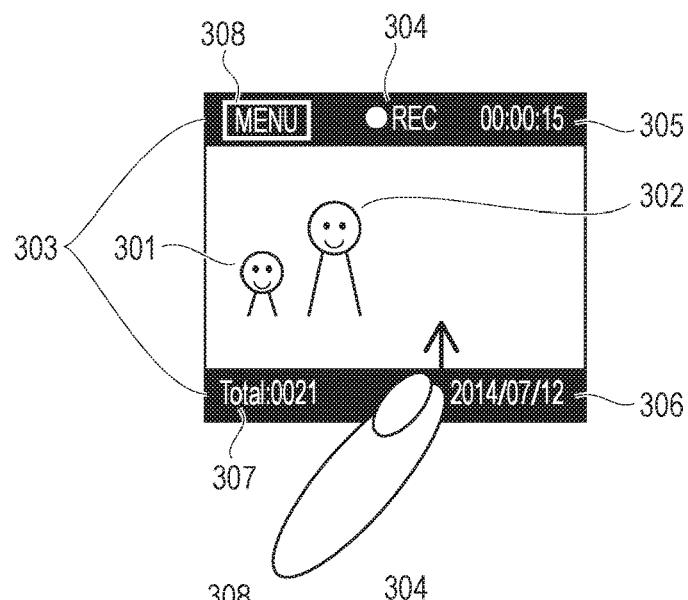
FIGS. 6A to 6C illustrate an example of a screen of a display panel according to the second embodiment.
Figure 6B:
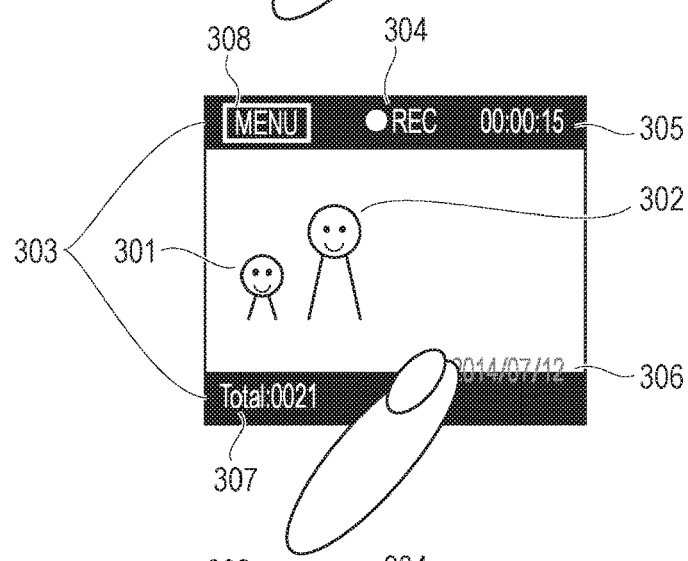
Figure 6C:
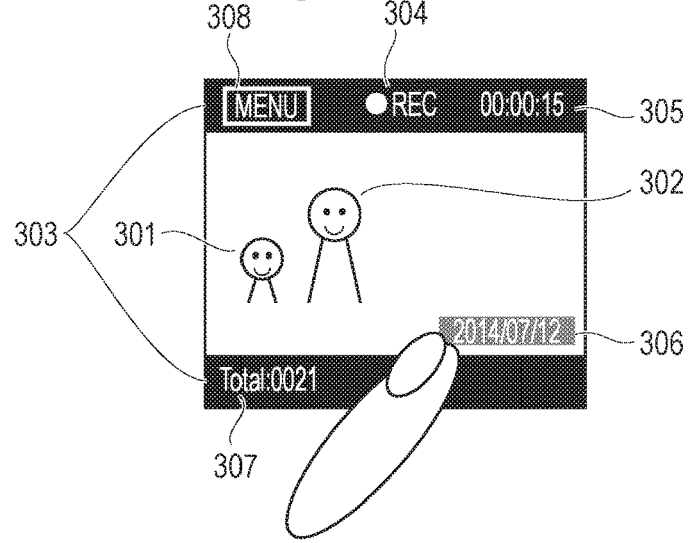

FIGS. 6A to 6C illustrate an example of a screen displayed on a display panel 111 when a display item is touched and dragged onto an image 301, and display changes from FIG. 6A, FIG. 6B, to FIG. 6C.

FIG. 6A illustrates a state in which the user touches a date item 306 and just before he/she moves his/her finger in the direction of the arrow. Here, since the date item 306 has not started to move, the entire date item 306 is displayed within a black mask area 303. At this time, the date item 306 is displayed by white letters, for example, so that the date item 306 can be recognized on the black mask area 303.

FIG. 6B illustrates a state in which the user touches and drags the date item 306. Here, the date item 306 is displayed over the black mask area 303 and the image 301. At this time, the date item 306 is displayed by gray letters, for example, so that the user can recognize that the date item 306 is not superimposed and recorded.

FIG. 6C illustrates a state in which the user drags the date item 306. Here, the entire date item 306 is displayed within the image 301. At this time, the date item 306 is shown by letters with different background, for example, so that the user can recognize that the date item 306 is superimposed and recorded.

Figure 7:
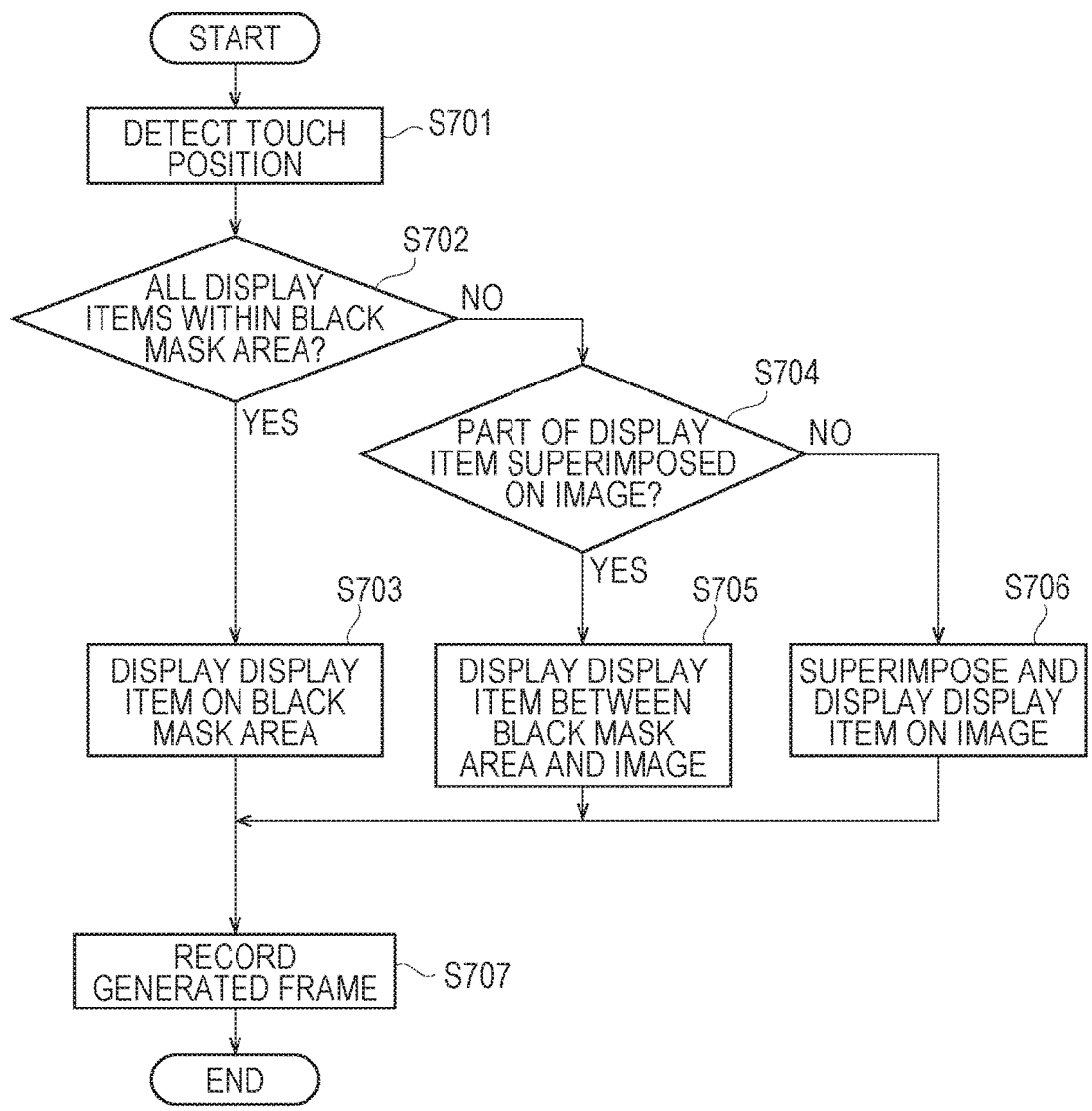
FIG. 7 is a flow chart showing a process according to the second embodiment.

FIG. 7 is a flow chart showing a process focusing on display control according to the present embodiment. The flow chart of FIG. 7 is started when a display item to be superimposed and recorded out of the display items displayed on the display panel 111 is touched and dragged. That is, here, the flow chart is started when a CPU 107 detects any drag of a time item 305 or the date item 306 from a touch panel 109. The flow chart of FIG. 7 is realized when the CPU 107 reads out a program from a data memory unit 106, expands the program to a temporary memory unit 103, and executes the program.

In Step S701, the CPU 107 detects a position where the touch panel 109 is touched (hereinafter referred to as touch position) in a state in which the user drags a display item.

Specifically, the CPU 107 acquires the coordinates of the touch position from the touch panel 109.

In Step S702, the CPU 107 determines whether or not the entire display item is within the black mask area 303 when the display item is displayed on a display panel 111 at the detected touch position. The CPU 107 can acquire the position of the display item on the display panel 111 on the basis of the touch position and the size of the display item stored in the data memory unit 106. Therefore, the CPU 107 can determine whether or not the entire display item is within the black mask area 303 on the basis of the position of the black mask area 303 stored in the temporary memory unit 103 and the acquired position of the display item. The process proceeds to Step S703 if the entire display item is within the black mask area 303 and proceeds to Step S704 if not.

In Step S703, the CPU 107 displays the display item at the detected touch position. That is, the CPU 107 displays the display item so that it is within the black mask area 303 in its entirety. This process corresponds to a process for displaying the display item with a smaller area where the display item is superimposed on the image 301 as compared with a case in which the display item is superimposed and displayed on the image 301. At this time, the CPU 107 displays the display item by white letters, for example.

In Step S704, the CPU 107 determines whether or not a part of the display item is superimposed on the image 301 when the display item is displayed on the display panel 111 at the detected touch position. The CPU 107 can determine whether or not a part of the display item is superimposed on the image 301 on the basis of the position of the black mask area 303 stored in the temporary memory unit 103 and the acquired position of the display item. The process proceeds to Step S705 if a part of the display item is superimposed on the image 301. On the other hand, the process proceeds to Step S706 if a part thereof is not superimposed, that is, if the entire display item is within the image 301.

In Step S705, the CPU 107 displays the display item at the detected touch position. That is, the CPU 107 displays the display item between (at the boundary of) the image 301 and the black mask area 303. This process corresponds to a process for displaying the display item with a smaller area where the display item is superimposed on the image 301 as compared with a case in which the display item is superimposed and displayed on the image 301. At this time, the CPU 107 displays the display item by gray letters, for example, so that the user can recognize that the display item is not superimposed and recorded on the image 301.

In Step S706, the CPU 107 displays the display item at the detected touch position. That is, the CPU 107 superimposes and displays the display item on the image 301. At this time, the CPU 107 displays the display item by letters with different background for example, so that the user can recognize that the display item is superimposed and recorded on the image 301.

In Step S707, the CPU 107 stores the image in the motion image memory unit 105 after determining whether or not to superimpose and record the display item on the image on the basis of the position where the display item is displayed.

Specifically, the CPU 107 generates a frame with the display item superimposed and displayed on the image 301 superimposed and added on the predetermined position of a frame for recording when the display item is superimposed and displayed on the image 301 (when the process proceeds via Step S706). Here, the CPU 107 adds the display item so that the same position as the position displayed in Step S706 is obtained. Then, the CPU 107 can record an image with the display item superimposed by storing the generated frame in the motion image memory unit 105.

On the other hand, the CPU 107 stores the frame for recording in the motion image memory unit 105 without any modification when the display item is not superimposed and displayed on the image 301 or when a part of the display item is superimposed and displayed on the image (when the process proceeds via Step S703 or Step S705).

A motion image on which a display item is superimposed or a motion image on which a display item is not superimposed is recorded by repeating the processes from Step S701 to Step S707 until recording of the captured image is completed.

According to the present embodiment, an image similar to the displayed image is recorded by superimposing and recording a display item on an image if the display item is to be superimposed and displayed on the image and by recording a display item without superimposing on an image if the display item is to be displayed without superimposing on the image. Therefore, the user can intuitively recognize whether or not a display item is to be recorded and visibility of an image can be improved when a display item is not displayed on an image.

In addition, since a case in which a display item is to be superimposed and recorded on an image and a case in which a display item is to be recorded without superimposing on an image can be switched in accordance with the position to display the display item by the operation of the user, the user can intuitively select an intended way of recording.

Note that, the second embodiment can be carried out together with the first embodiment. That is, OSD superimpose recording setting described with reference to FIG. 4A is changed to off when the display item is moved to the position where it is superimposed on the image by touch and drag if OSD superimpose recording is set to the setting other than off and the display item is displayed without superimposing on the image.

Note that, the following control is also possible when the display item is moved by touch and drag.

When "touch down" against the display item is detected on the screen displaying a captured image with OSD superimpose recording being off, a first guide is displayed. The first guide notifies the user that it is possible to superimpose and record the touched display item on the captured image by turning on OSD superimpose recording by dragging the touched display item to the display area of the captured image. Thereafter, when the display item is dragged and the touch position is moved into the display area of the captured image before "touch up," a second guide is displayed. The second guide notifies the user that the touched display item can be superimposed and recorded on the captured image by turning on OSD superimpose recording when "touch up" is detected. Then, when "touch up" is detected with the touch position within the display area of the captured image, OSD superimpose recording setting is turned on so that the dragged display item is superimposed and recorded on the captured image. If "touch up" is detected after the touch position is moved to outside of the display area of the captured image, OSD superimpose recording setting is not changed.

In contrast, when "touch down" against the display item superimposed and displayed on the captured image is detected on the screen displaying the captured image with OSD superimpose recording being on, a third guide is displayed. The third guide notifies the user that superimpose recording of the display item can be cancelled by dragging the touched display item toward outside of the display area of the captured image. Thereafter, when the display item is dragged and the touch position is moved to outside of the display area of the captured image before "touch up," a fourth guide is displayed. The fourth guide notifies the user that it is possible to stop superimposing and recording the touched display item on the captured image by changing OSD superimpose recording in response to "touch up". Then, when "touch up" is detected with the touch position being outside the display area of the captured image, OSD superimpose recording setting is changed so that the image is recorded with the dragged display item not being superimposed on the captured image. OSD superimpose recording setting is not changed if "touch up" is detected after the touch position is moved into the display area of the captured image.

Third Embodiment

In the first embodiment, a case with the aspect ratio of the display panel 111 being 4:3 and the aspect ratio of the motion image content being 16:9 has been described. In the third embodiment, a case with the aspect ratio of a display panel 111 being 2:1 and the aspect ratio of a motion image content being 4:3 will be described. Note that, the configuration of a video camera 100 is the same as that of the first embodiment and description thereof will be omitted.

Figure 8A:
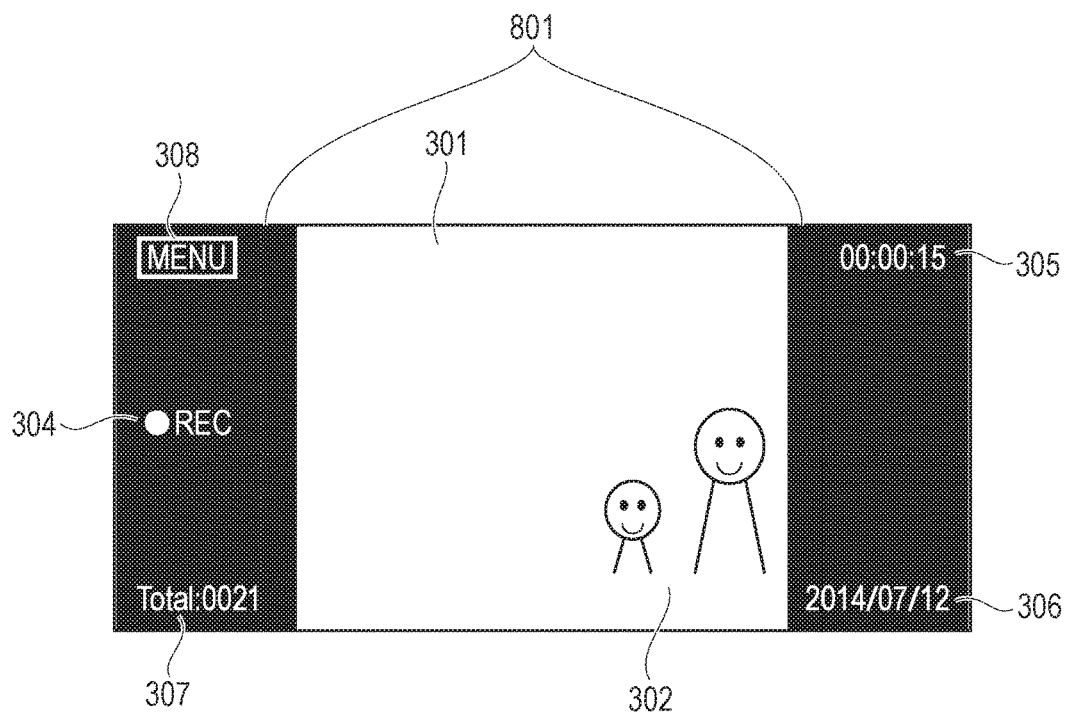
FIGS. 8A and 8B illustrate an example of a screen of a display panel according to the third embodiment.
Figure 8B:
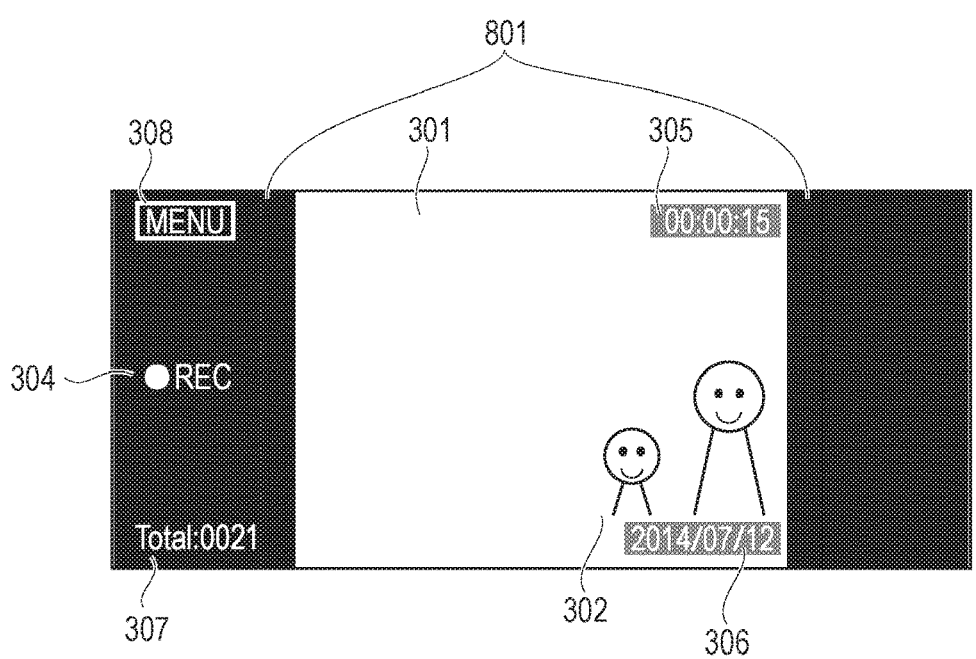

FIGS. 8A and 8B illustrate an example of a screen displayed on the display panel 111. Here, since the display panel 111 is wide with respect to the motion image content, there are black mask areas 801 on the right and left of an image 301. In addition, since the black mask areas 801 are located on the right and left of the image 301, display items are also displayed on the right and left.

FIG. 8A illustrates an example of a screen displayed on the display panel 111 when a display item is not superimposed and recorded. Here, a time item 305 and a date item 306 are displayed on the black mask area 801.

FIG. 8B illustrates an example of a screen displayed on the display panel 111 when a display item is superimposed and recorded. Here, the time item 305 and the date item 306 are displayed on the image 301.

FIG. 9 is a flow chart showing a process focusing on display control according to the present embodiment. The flow chart of FIG. 9 is started when the video camera 100 starts capturing an image. In addition, the flow chart of FIG. 9 is realized when the CPU 107 reads out a program from a data memory unit 106, expands the program to a temporary memory unit 103, and executes the program. Note that, the same step numbers are given to the processes shown in the flow chart of FIG. 5 described in the first embodiment and description thereof will be omitted.

In Step S901, the CPU 107 determines the display position of the black mask area. Specifically, the CPU 107 compares the aspect ratio of the display panel 111 with the aspect ratio of the motion image content, and determines which of upper, lower, right, and left of the image 301 the black mask area is to be located.

Note that, although the aspect ratio of the display panel 111 is 2:1 and the aspect ratio of the motion image content is 4:3 here, the aspect ratio of the motion image content may be changed according to setting of the menu. In this case, the CPU 107 can determine the position of the black mask area according to the aspect ratio that has been set. In addition, the display panel 111 may be detachable. In this case, the CPU 107 can determine the position of the black mask area according to the aspect ratio of the attached display panel 111.

According to the present embodiment, an image can be efficiently displayed on the display panel 111 and a black mask area can be displayed at an appropriate position by determining the display position of the black mask area according to the aspect ratio of the motion image content and the aspect ratio of the display panel 111. Therefore, it is possible to improve visibility of an image and a display item displayed on the black mask area.

While the present embodiments have been described above, these embodiments are not seen to be limiting. Moreover, while each of the above-described embodiments is merely one embodiment, they can be combined as appropriate.

Note that, control by the CPU 107 described above may be done by one hardware or several hardware may control the entire device with each hardware carrying out each process.

In addition, while a case in which the display items to be superimposed on the image are the time item 305 and the date item 306 has been described in the embodiments described above, these embodiments are not seen to be limiting. For example, any image and letter set by the user may be superimposed and displayed and recorded on an image.

Moreover, while a case in which the display item is displayed on the black mask area 303 has been described in the above embodiments, these embodiments are not seen to be limiting and a display item may be simply displayed in a blank area.

Furthermore, while the above-described embodiments have described the video camera 100, any recording device that can display and record an image is applicable. For example, a personal computer, a PDA, a smartphone, a tablet, a mobile phone, a mobile image viewer, a digital photo frame, a gaming device, an e-book reader, etc.

Other Embodiments

Various embodiments can also be realized in a process in which a program realizing one or more functions of the embodiments described above is provided to a system or a device via network or a storage medium and one or more processors in the computer of that system or device reads and executes such a program. In addition, the various embodiments can also be realized by a circuit that realizes one or more functions (for example, ASIC).

According to various embodiments, it is possible to superimpose and record a display item on an image while maintaining visibility of an image.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-007393, filed Jan. 18, 2016, which is hereby incorporated by reference herein in its entirety.

What is claimed is:

1. An image processing device, comprising:
   a processor; and
   a memory storing a program which, when executed by the processor, causes the image processing device to:
   display an image and an item on a screen;
   set whether or not to superimpose and record an item on the image; and
   store the image on which the item is superimposed, in a memory unit, when the item is set to be superimposed and recorded on the image, and store the image on which the item is not superimposed, in the memory unit, when the item is set to be recorded without being superimposed on the image,
   wherein the item is controlled to be located on the image and displayed on the screen when the item is set to be superimposed and recorded on the image, and the item is controlled to be located on a blank area generated by a difference between an aspect ratio of the image and an aspect ratio of the screen, and displayed on the screen when the item is set to be recorded without being superimposed on the image.

2. The image processing device according to claim 1, wherein the program when executed by the processor further causes the image processing device to:
   detect a touch operation to the screen,
   wherein the item is moved in accordance with detection of a touch operation to a position on the screen where the item is displayed.

3. The image processing device according to claim 1, wherein
   the item is displayed in different modes when the display item is located on the image and when the display item is located on the blank area.

4. The image processing device according to claim 1, wherein the program when executed by the processor further causes the image processing device to:
   temporarily store, in a buffer memory that is different from the memory unit, the image obtained with a camera unit; and
   display the image that is read from the buffer memory with the item.

5. The image processing device according to claim 1, wherein the image is motion image and the item is still image.

6. A method for controlling an image processing device, comprising:

displaying an image and an item on a screen;

setting whether or not to superimpose and record an item on the image; and storing the image on which the item is superimposed, in a memory unit, when the item is set to be superimposed and recorded on the image, and storing the image on which the item is not superimposed, in the memory unit, when the item is set to be recorded without being superimposed on the image, wherein the item is controlled to be located on the image and displayed on the screen when the item is set to be superimposed and recorded on the image, and the item is controlled to be located on a blank area generated by a difference between an aspect ratio of the image and an aspect ratio of the screen, and displayed on the screen when the item is set to be recorded without being superimposed on the image.

7. A non-transitory computer-readable storage medium storing a program that, when executed by a processor, causes the processor to perform operations comprising:

displaying an image and an item on a screen;

setting whether or not to superimpose and record an item on the image; and storing the image on which the item is superimposed, in a memory unit, when the item is set to be superimposed and recorded on the image, and storing the image on which the item is not superimposed, in the memory unit, when the item is set to be recorded without being superimposed on the image, wherein the item is controlled to be located on the image and displayed on the screen when the item is set to be superimposed and recorded on the image, and the item is controlled to be located on a blank area generated by a difference between an aspect ratio of the image and an aspect ratio of the screen, and displayed on the screen when the item is set to be recorded without being superimposed on the image.

\* \* \* \* \*